United States Patent [19]

Drori

[11] Patent Number: 4,906,373
[45] Date of Patent: Mar. 6, 1990

[54] MULTIPLE FILTER ELEMENTS WITH MOVABLE FLUSHING ASSEMBLY

[76] Inventor: Mordeki Drori, 89 Zahal Street, Kiron, Israel

[21] Appl. No.: 223,872

[22] Filed: Jul. 25, 1988

[51] Int. Cl.[4] .................. B01D 29/38; B01D 33/08
[52] U.S. Cl. .................. 210/331; 210/333.1; 210/334; 210/414
[58] Field of Search ............ 210/327, 329, 330, 331, 210/332, 333.01, 392, 409, 413, 415, 333.1, 328, 334, 414

[56] References Cited

U.S. PATENT DOCUMENTS

| Re. 21,107 | 5/1939 | Seitz | 210/188 |
|---|---|---|---|
| 26,709 | 11/1969 | Linden et al. | 210/500 |
| 226,271 | 4/1880 | Blaisdell | 210/488 |
| 428,307 | 5/1890 | Leland | 210/488 |
| 623,324 | 4/1899 | Levi | 210/329 |
| 730,485 | 6/1903 | Simoneton | 210/488 |
| 1,581,998 | 4/1926 | Fulcher | 210/488 |
| 1,602,647 | 10/1926 | Carr | 210/488 |
| 1,642,864 | 9/1927 | Williams | 210/488 |
| 1,643,299 | 9/1927 | Furness | 210/488 |
| 1,673,743 | 6/1928 | Fulcher | 210/415 |
| 1,719,346 | 7/1929 | Thompson | 210/488 |
| 1,797,399 | 3/1931 | Boulade | 210/486 |
| 1,804,512 | 5/1931 | Pickard | 210/492 |
| 1,849,042 | 3/1932 | Pickard | 210/488 |
| 1,852,873 | 4/1932 | Berger | 210/334 |
| 1,906,391 | 5/1933 | McKinley | 210/413 |
| 1,926,557 | 9/1933 | Perkins | 210/167 |
| 1,929,246 | 10/1933 | Hechenbleikner | 183/50 |
| 1,955,903 | 4/1934 | Cammen | 210/130 |
| 1,976,547 | 10/1934 | Dumas | 210/169 |
| 2,137,556 | 11/1938 | Young | 210/488 |
| 2,330,945 | 10/1943 | Becker | 210/169 |
| 2,365,525 | 12/1944 | Cox | 210/492 |
| 2,374,756 | 5/1945 | Kisch et al. | 210/170 |
| 2,455,486 | 12/1948 | Hicks | 210/169 |
| 2,495,095 | 1/1950 | Ewbank | 210/169 |
| 2,507,827 | 6/1950 | Stafford et al. | 123/44 |
| 2,508,602 | 5/1950 | Goetz | 210/203 |
| 2,519,506 | 8/1950 | Russell | 210/183 |
| 2,554,016 | 5/1951 | Czarnecki | 210/492 |
| 2,575,995 | 11/1951 | Briggs | 210/492 |
| 2,583,423 | 1/1952 | Hallinan | 210/185 |
| 2,631,732 | 3/1953 | Vocelka | 210/492 |
| 2,654,440 | 10/1953 | Robinson | 210/492 |
| 2,665,813 | 1/1954 | Bollaert | 210/283 |
| 2,670,851 | 3/1954 | Curtis | 210/120 |
| 2,692,686 | 10/1954 | Fleck | 210/488 |
| 2,696,306 | 12/1954 | Gomery | 210/425 |
| 2,702,637 | 2/1955 | Shepard | 210/492 |
| 2,742,158 | 4/1956 | Schuller | 210/152 |
| 2,757,802 | 8/1956 | Schmid | 210/169 |
| 2,758,877 | 8/1956 | Gleason | 137/872 |
| 2,843,267 | 7/1958 | Anderson | 210/236 |
| 2,847,126 | 8/1958 | Goodman | 210/411 |
| 2,855,106 | 10/1958 | English | 210/492 |

(List continued on next page.)

FOREIGN PATENT DOCUMENTS

| 126722 | 2/1948 | Australia | 210/492 |
|---|---|---|---|
| 156599 | 5/1954 | Australia | 210/492 |
| 156721 | 5/1954 | Australia | |

(List continued on next page.)

OTHER PUBLICATIONS

Spielman, Lloyd A., "Particle Capture from Low-Speed Laminar Flows", Am. Rev. Fluid Mech, 1977, 9:297–319.

Primary Examiner—Richard V. Fisher
Assistant Examiner—Wanda L. Millard
Attorney, Agent, or Firm—Pearne, Gordon, McCoy & Granger

[57] ABSTRACT

A multiple element filter system comprising a filter housing defining a water inlet for water to be filtered, a filtered water outlet, a plurality of cylindrical filter elements, each defining upstream and downstream surfaces, disposed in the filter housing such that the upstream surfaces communicate with the water inlet and the downstream surfaces communicate with the filtered water outlet, and a flushing assembly including a movable flushing communication member arranged for selectable flushing communication with the upstream surfaces of each of the plurality of filter elements and apparatus for selectable coupling of the communication member to a flush drain at atmospheric or relatively low pressure.

20 Claims, 2 Drawing Sheets

U.S. PATENT DOCUMENTS

| | | | |
|---|---|---|---|
| 2,873,030 | 2/1959 | Ashton | 210/488 |
| 2,889,048 | 6/1959 | Nordin | 210/409 |
| 2,892,240 | 6/1959 | Frankenhoff | 25/157 |
| 2,926,137 | 2/1960 | Calvert | 210/500 |
| 2,956,016 | 10/1960 | Leppla | 210/503 |
| 2,978,108 | 4/1961 | Strassheim | 210/488 |
| 3,005,556 | 10/1961 | Jensen | 210/488 |
| 3,105,042 | 9/1963 | Roosa | 210/444 |
| 3,111,963 | 11/1963 | Brockwell | 210/492 |
| 3,151,071 | 9/1964 | Kasten | 210/488 |
| 3,195,730 | 7/1965 | Muller | 210/488 |
| 3,233,741 | 2/1966 | Bell | 210/500 |
| 3,272,342 | 9/1966 | McLaren et al. | 210/340 |
| 3,278,040 | 10/1966 | Goldberg | 210/500 |
| 3,282,435 | 11/1966 | Goldberg | 210/500 |
| 3,330,414 | 7/1967 | Mecky | 210/227 |
| 3,335,869 | 8/1967 | Hedges | 210/500 |
| 3,370,712 | 2/1968 | Smith | 210/492 |
| 3,382,982 | 5/1968 | Stevens | 210/184 |
| 3,445,002 | 5/1969 | Muller | 210/108 |
| 3,448,862 | 6/1969 | Kudlaty | 210/488 |
| 3,473,668 | 10/1969 | Bunyard | 210/492 |
| 3,503,511 | 3/1970 | Spitzberg | 210/232 |
| 3,511,374 | 5/1970 | Beal | 209/258 |
| 3,529,726 | 9/1970 | Keenan | 210/232 |
| 3,561,602 | 2/1971 | Molitor | 210/266 |
| 3,622,003 | 11/1971 | Czech | 210/108 |
| 3,647,084 | 3/1972 | Martin | 210/492 |
| 3,648,843 | 3/1972 | Pearson | 210/443 |
| 3,666,107 | 5/1972 | Boggs | 210/483 |
| 3,703,465 | 11/1972 | Reese et al. | 210/333 |
| 3,789,990 | 2/1974 | Drori | 210/310 |
| 4,026,806 | 5/1977 | Drori | 210/405 |
| 4,042,504 | 8/1977 | Drori | 210/107 |
| 4,045,345 | 8/1977 | Drori | 210/107 |
| 4,062,774 | 12/1977 | Hinojosa | 210/94 |
| 4,067,812 | 1/1978 | Drori | 210/310 |
| 4,082,057 | 4/1978 | Hayes | 118/9 |
| 4,115,274 | 9/1978 | Boddeker | 210/321.1 |
| 4,119,540 | 10/1978 | Muller | 210/333.1 |
| 4,156,651 | 5/1979 | Mehoudar | 210/108 |
| 4,204,961 | 5/1980 | Cusato, Jr. | 210/232 |
| 4,207,181 | 6/1980 | Drori | 210/111 |
| 4,210,538 | 7/1980 | Tantillo et al. | 210/333.1 |
| 4,213,861 | 7/1980 | Muller et al. | 210/333.1 |
| 4,251,374 | 2/1981 | Cunningham | 210/232 |
| 4,267,042 | 5/1981 | Hofmann | 210/169 |
| 4,267,045 | 5/1981 | Hoof | 210/322 |
| 4,271,018 | 6/1981 | Drori | 210/107 |
| 4,278,540 | 7/1981 | Drori | 210/107 |
| 4,284,500 | 8/1981 | Keck | 209/250 |
| 4,295,963 | 10/1981 | Drori | 210/108 |
| 4,297,209 | 10/1981 | De Visser et al. | 210/107 |
| 4,308,142 | 12/1981 | Braukmann | 210/355 |
| 4,312,374 | 1/1982 | Drori | 137/469 |
| 4,402,829 | 9/1983 | Cordua | 210/333.01 |
| 4,410,430 | 10/1983 | Hagler | 210/446 |
| 4,430,232 | 2/1984 | Doucet | 210/798 |
| 4,435,287 | 3/1984 | Sumimoto | 210/488 |
| 4,462,916 | 7/1984 | Ecabert et al. | 210/333.1 |
| 4,468,319 | 8/1984 | Laakso | 210/97 |
| 4,481,111 | 11/1984 | Christophe | 210/333.01 |
| 4,495,068 | 1/1985 | Rosaen | 210/91 |
| 4,517,089 | 5/1985 | Armand | 210/488 |
| 4,552,655 | 11/1985 | Granot | 210/108 |
| 4,552,662 | 11/1985 | Webster | 210/232 |
| 4,572,784 | 2/1986 | Drori | 210/133 |
| 4,582,603 | 4/1986 | Nasse | 210/413 |
| 4,592,838 | 6/1986 | Christophe et al. | 210/323.1 |
| 4,592,839 | 6/1986 | Rosenberg | 210/352 |
| 4,614,581 | 9/1986 | Drori | 210/108 |
| 4,624,785 | 11/1986 | Drori | 210/414 |
| 4,642,182 | 2/1987 | Drori | 210/232 |
| 4,642,188 | 2/1987 | DeVisser et al. | 210/333.1 |
| 4,654,143 | 3/1987 | Drori | 210/232 |
| 4,655,910 | 4/1987 | Tabor | 210/107 |
| 4,655,911 | 4/1987 | Tabor | 210/107 |
| 4,683,060 | 7/1987 | Drori | 210/448 |
| 4,707,258 | 11/1987 | Drori | 210/333.1 |
| 4,732,673 | 3/1988 | Dagard et al. | 210/247 |
| 4,735,730 | 4/1988 | Bratten | 210/741 |
| 4,744,901 | 5/1988 | Drori | 210/323.1 |
| 4,751,000 | 6/1988 | Drori | 210/448 |
| 4,753,731 | 6/1988 | Drori | 210/492 |
| 4,781,825 | 11/1988 | Grimes et al. | 210/333.1 |

FOREIGN PATENT DOCUMENTS

| | | | |
|---|---|---|---|
| 549633 | 12/1957 | Canada | 210/492 |
| 586111 | 11/1959 | Canada | |
| 0177434 | 4/1986 | European Pat. Off. | |
| 846245 | 8/1952 | Fed. Rep. of Germany | |
| 1007743 | 5/1957 | Fed. Rep. of Germany | |
| 1289827 | 2/1969 | Fed. Rep. of Germany | |
| 2453445 | 5/1976 | Fed. Rep. of Germany | |
| 3044843 | 9/1981 | Fed. Rep. of Germany | |
| 899337 | 5/1945 | France | |
| 1157258 | 2/1963 | France | |
| 1543176 | 9/1968 | France | |
| 69638 | 1/1983 | Israel | |
| 68288 | 5/1983 | Israel | 210/488 |
| 69679 | 6/1983 | Israel | |
| 68935 | 9/1983 | Israel | |
| 473331 | 7/1952 | Italy | |
| 44-2926 | 2/1969 | Japan | |
| 10814 | of 1884 | United Kingdom | 210/488 |
| 300600 | 11/1928 | United Kingdom | |
| 570960 | 7/1945 | United Kingdom | |
| 687967 | 2/1953 | United Kingdom | |
| 841207 | 7/1960 | United Kingdom | |
| 926600 | 5/1963 | United Kingdom | |
| 1096739 | 12/1967 | United Kingdom | 210/488 |

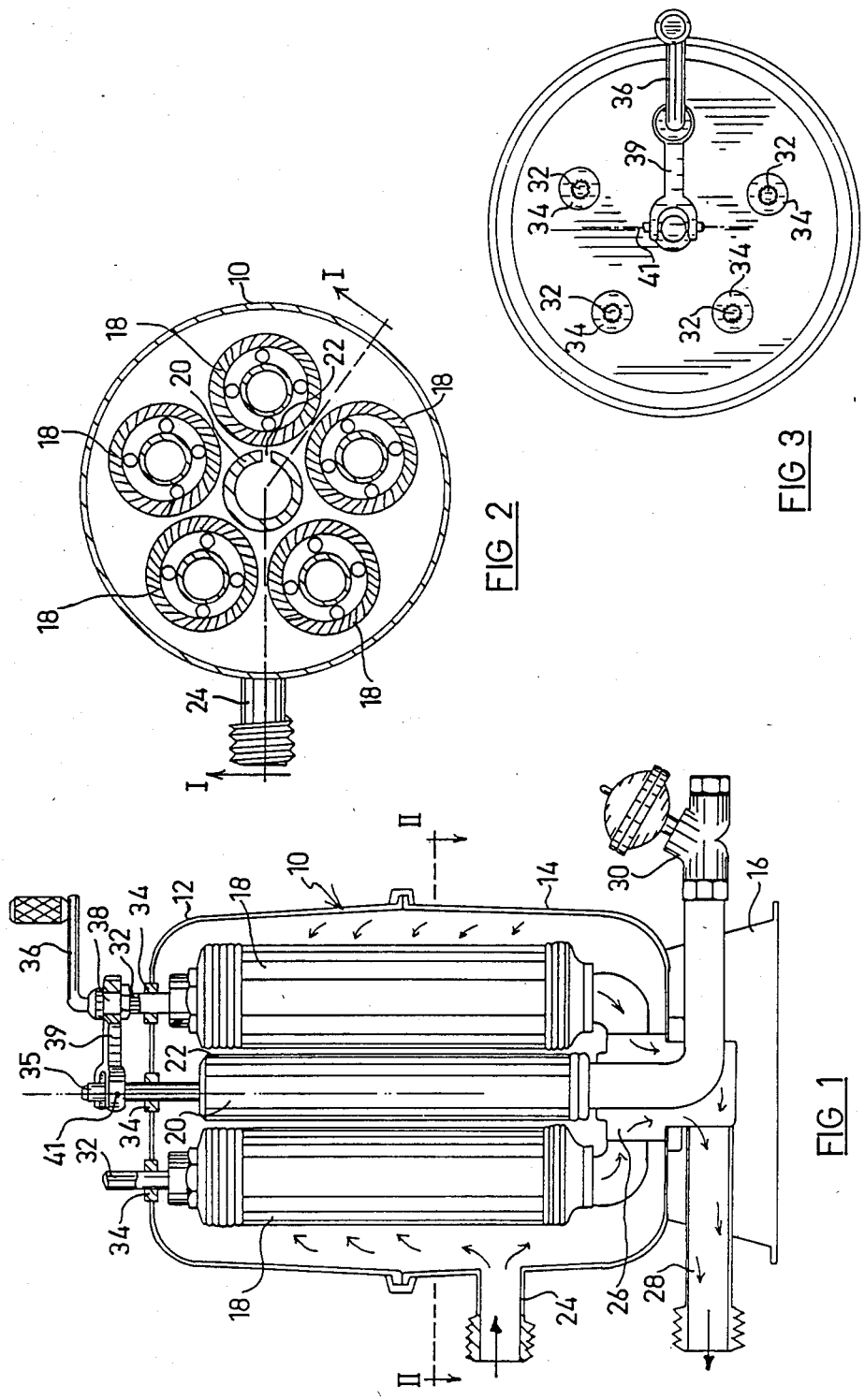

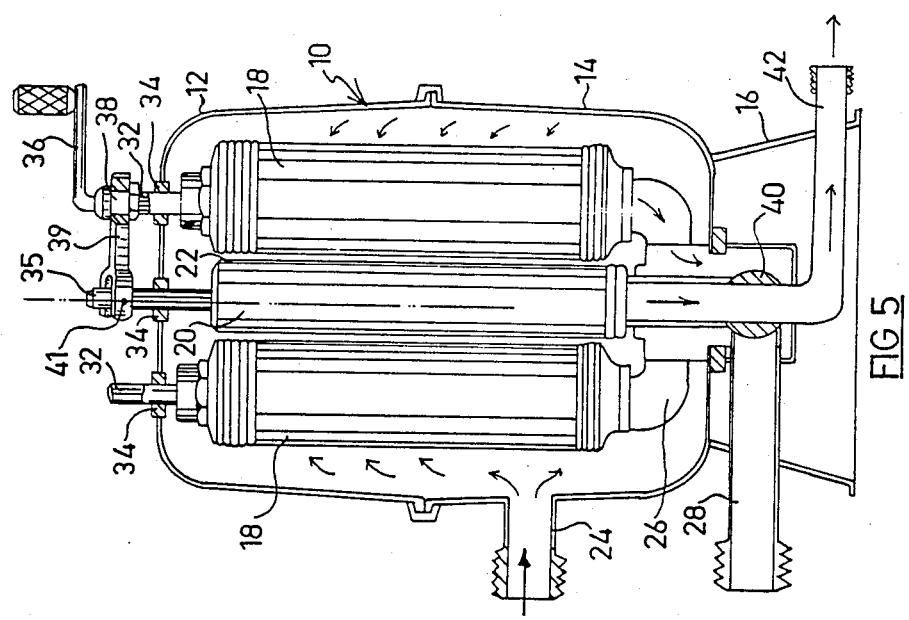
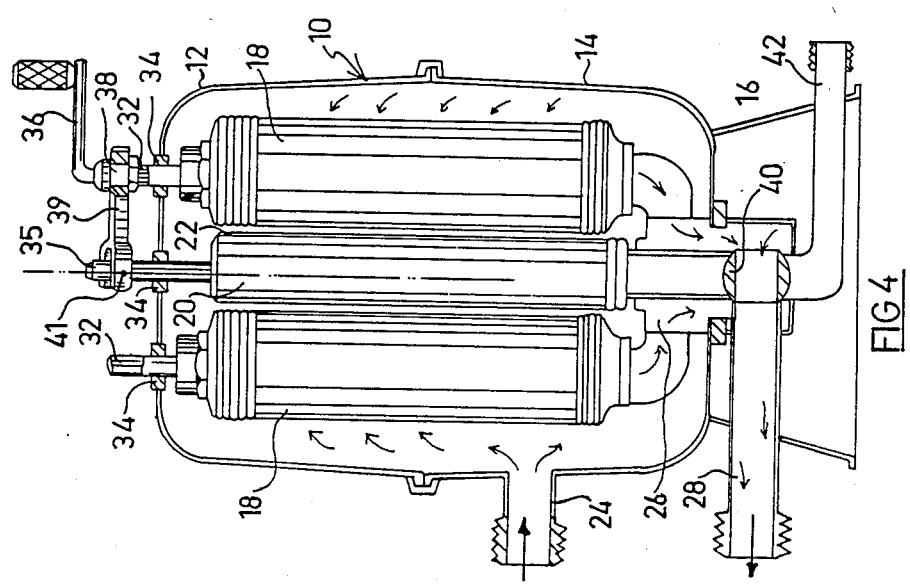

MULTIPLE FILTER ELEMENTS WITH MOVABLE FLUSHING ASSEMBLY

FIELD OF THE INVENTION

The present invention relates to filtering systems and more particularly to filtering systems employing cylindrical filter elements.

BACKGROUND OF THE INVENTION

Filtering systems including cylindrical filter elements are shown and described in the following patents and patent applications of the present applicant:

U.S. Pat. Nos. 4,026,806; 4,045,345; 4,067,812; 4,207,181; 4,624,785

U.S. patent applications 623,353, now U.S. Pat. No. 4,681,681; 647,093, now abandoned.

Israel patent application Nos. 71674 and 73923

In filtering systems of the general type described hereinabove, periodic cleaning of the filter elements is required and is normally achieved by opening the filter housing, removing the filter element from the housing and flushing it with a stream of water.

In self-flushing systems such as the type described and claimed in U.S. Pat. No. 4,045,345 having a single filter element, such cleaning is accomplished automatically, without the need to open the filter housing.

SUMMARY OF THE INVENTION

The present invention seeks to provide a multiple element filter system wherein cleaning of the filter elements may be accomplished without opening the filter housing and removing the elements.

There is thus provided in accordance with a preferred embodiment of the present invention a multiple element filter system comprising a filter housing defining a water inlet for water to be filtered, a filtered water outlet, a plurality of cylindrical filter elements, each defining upstream and downstream surfaces, disposed in the filter housing such that the upstream surfaces communicate with the water inlet and the downstream surfaces communicate with the filtered water outlet, and a flushing assembly including a movable flushing communication member arranged for selectable flushing communication with the upstream surfaces of each of the plurality of filter elements and apparatus for selectable coupling of the communication member to a flush drain at atmospheric or relatively low pressure.

In accordance with an embodiment of the invention, the flushing assembly includes means for providing relative rotation between the flushing communication member and the plurality of filter elements about a first axis and rotation of each filter element about its own longitudinal axis which lies parallel to the first axis.

In accordance with a preferred embodiment of the present invention, the upstream surface is the outer surface, the flushing communication member is centrally located with respect to the plurality of filter elements and they are mounted for selectable relative rotation whereby the communication member selectably engages the outer surfaces of the individual elements.

Further in accordance with a preferred embodiment of the invention manually operative apparatus is provided exterior of the filter housing for selectably rotating the flushing communication member into communication with the outer surfaces of the individual elements and for providing rotation of the individual filter elements while in communication with the communication member.

Additionally in accordance with an embodiment of the invention, the communication member is formed with an elongate engagement flush inlet slot which is brought into flushing communication with the outer surfaces of the individual elements by rotation of the communication member.

Further in accordance with an embodiment of the invention the apparatus exterior of the filter housing for rotating the communication member and the elements comprises communication member extension means coupled to the communication member and element extension means coupled to the individual element, for providing rotation thereof about their respective longitudinal axes from a location external of the filter housing.

Additionally in accordance with this embodiment of the invention, there is provided a rotation crank handle for providing manually driven rotation of the individual element extension means, and a handle support onto which the rotation handle is mounted, the handle support being coupled to the communication member extension means and rotatable therewith such that when the handle is located for engagement with a given element for rotation thereof, the inlet slot of the communication member is in operative flushing communication with the outer surface of that element, whereby rotation of the element causes the entire outer surface of the element to be scanned by the inlet slot, the pressure relationship being such that when the communication member is coupled to the flush drain, a positive pressure gradient exists across the portion of the element in flushing communication with the slot causing dirt from the element to be flushed into the slot and out the drain.

According to a preferred embodiment of the invention the apparatus for selectable coupling of the communication member to a flush drain at atmospheric or relatively low pressure comprises means for blocking the water outlet during flushing.

BRIEF DESCRIPTION OF THE DRAWINGS

The present invention will be understood and appreciated more fully from the following detailed description taken in conjunction with the drawings in which:

FIG. 1 is a side sectional illustration of a filter system constructed and operative in accordance with an of the present invention;

FIG. 2 is a horizontal sectional illustration of the system of FIG. 1 taken along lines II—II in FIG. 1, it being noted that FIG. 1 is taken along the lines I—I in FIG. 2;

FIG. 3 is a top view illustration of the system of FIGS. 1 and 2, corresponding in operative orientation to FIG. 2;

FIG. 4 is a side sectional illustration of a preferred embodiment of the invention in a non-flushing orientation; and FIG. 5 is a side sectional illustration of the embodiment of FIG. 4 in a flushing orientation.

DETAILED DESCRIPTION OF THE INVENTION

Reference is now made to FIGS. 1–3 which illustrate the filter system of an embodiment of the present invention. The filter system comprises a sealed filter housing 10, typically including top and bottom portions 12 and 14 which are mounted on a support base 16. Disposed inside the the filter housing 10 are a plurality of filter elements 18, preferably in the form of stacks 18 of filter discs, which are operative to filter water passing therethrough. Examples of suitable filter discs and stacks for this purpose appear in the following patents and patent applications of the present applicant:

U.S. Pat. Nos. 4,026,806; 4,045,345; 4,067,812; 4,207,181; 4,624,785

U.S. patent application Ser. Nos. 623,353; 647,093;

Israel patent application Nos. 71674 and 73923

As seen in the drawings, the elements 18 are arranged to have their respective longitudinal axes generally symmetrical about the center of the housing. Located centrally of the stacks is a flushing communication member 20, which is typically a pipe sealed at one end and having a longitudinal slot 22 formed therein.

It is a particular feature of this embodiment of the invention that the communication member 20 and the elements 18 are all rotatable about their individual longitudinal axes. It may be appreciated that the rotatability of member 20 provides selectable communication of slot 22 with the outer surfaces of each of elements 18, while the rotatability of each of elements 18 permit the slot 22, when in engagement with a given element 18 to effectively scan the entire outer surface of the element as it is rotated.

In the illustrated embodiment of the invention, a water inlet 24, for water to be filtered, is provided at the side of the housing, such that water to be filtered is provided at the outer surface of each of the filter elements 18. The interior surfaces of each of the elements communicate via a suitable manifold 26, which does not impede rotation of the elements about their longitudinal axes, with a filtered water outlet 28.

The engagement member 20 communicates via a manually or otherwise operable valve 30 with the outside atmosphere, or any relatively low pressure receptacle.

It is seen in FIGS. 1 and 3 that each of the elements 18 is provided with a suitably splined extension 32 which passes through the housing 10 via a suitable sealing bushing 34 or the like and which permits rotation of the element 18 about its longitudinal axis from outside the housing 10. The engagement member 20 is provided with a similar extension 35 for rotation of engagement member 20 about its own axis.

A rotation crank handle 36 having an associated socket 38 arranged for removable engagement with extensions 32 is rotatably mounted on a handle support 39. Handle support 39 is in turn mounted for rotation together with extension 35, such that the location of the socket 38 is coordinated with the orientation of the slot 22 of the communication member 20, whereby when socket 38 engages the extension 32 of a given element 18, the slot 22 of the communication member 20 is in operative engagement with the outer surface of that element.

Handle support 39 is provided with a pivotal mounting about an axis 41 perpendicular to the longitudinal axis of the communication member 20, so as to enable socket 38 to be removeably engaged with the various extensions 32.

The flushing operation of the filter system just described may be understood as follows: When it is desired to flush the system, valve 30 is opened, thus creating a pressure differential across the portion of the filter element which is in communication with slot 22 of the communication member. The high pressure side being the interior of each element which is at the pressure of the filtered water outlet, normally well above atmospheric pressure and the low pressure side being the interior of the engagement member which may be at atmospheric pressure.

It is noted that even if the engagement of the slot 22 with the outer surface of the element 18 is not particularly close, the outflow of unfiltered water from the interior of the filter housing need not be significant and can be helpful in removing dirt from the element under the pressure differential to enter the slot 22. The flow of unfiltered water from the interior of the filter housing 10 through slot 22 also increases the pressure differential due to the venturi effect.

It is a particular feature of the invention that a single rotation of the handle in engagement with each extension 32 causes the entire surface of an element 18 to be "scanned" and thus cleaned by slot 22. The arrangement of the handle support 39 ensures that the stack being rotated is the one in engagement with slot 22, such that the scanning of all of the stacks can be accomplished in a matter of minutes with simple hand movements and without requiring skilled workers.

It is appreciated that instead of rotating the engagement member 20, the elements 18 may be revolved thereabout. Similarly, in principle, the slot 22 could be revolved around the elements which could remain stationary. Also, a system of this type could be adapted for an arrangement wherein the inner surfaces of the stacks are at the upstream side. Nevertheless, the described embodiment is believed to be the most practical and efficient in construction and use.

Reference is now made to FIGS. 4 and 5 which illustrate a preferred embodiment of the present invention. The embodiment of FIGS. 4 and 5 is identical to that of FIGS. 1-3 in all relevant respects with the exception of those described specifically hereinbelow. The description of FIGS. 1-3 is to be considered equally applicable to FIGS. 4 and 5 with the exception of valve 30 and connection between manifold 26 and outlet 28.

In the embodiment of FIGS. 4 and 5, valve 30 is replaced by a valve 40, such as a ball valve, which may be operated from the exterior of the filter housing 10, as by a suitable handle (not shown). Valve 40 governs the communication between communication element 20 and the outside atmosphere or any relatively low pressure receptacle on the one hand, and between manifold 26 and filtered water outlet 28 in a mutually exclusive manner.

Thus, when valve 40 is positioned in a first position, during normal filter operation, as illustrated in FIG. 4, manifold 26 communicates with outlet 28, permitting the outflow of filtered water from the filter system. As seen in FIG. 4, when valve 40 is positioned in this first position for normal filter operation, communication between communication element 20 and the outside atmosphere at outlet 42 is prevented by valve 40.

When valve 40 is positioned in a second position, for flushing, as illustrated in FIG. 5, water communication is provided between communication element 20 and the outside atmosphere through outlet 42. At the same time, communication between manifold 26 and outlet 28 is prevented. This causes a pressure buildup at the interior surface of the filter elements 18 and increases the pressure gradient across the portion of the filter elements in communication with the slot 22, thus enhancing the efficiency of flushing. Effectively, the downstream, inner, surface of the filter elements is brought nearly up to the upstream, high input pressure to the filter system.

It will be appreciated by persons skilled in the art that the present invention is not limited by what has been particularly shown and described hereinabove. Rather the scope of the present invention is defined only by the claims which follow:

I claim:

1. A multiple element filter system comprising:
   a filter housing defining a water inlet for water to be filtered;
   a filtered water outlet;
   a plurality of cylindrical filter elements, each defining upstream and downstream surfaces, disposed in said filter housing such that during filtering operation said upstream surfaces communicate with said water inlet and said downstream surfaces communicate with said filtered water outlet;
   a flushing assembly including a movable flushing communication member arranged for selectable flushing communication with said upstream surfaces of each of said plurality of filter elements; and
   means for selectable coupling of said communication member to a flush drain,
   and wherein said communication member and said plurality of filter elements are mounted for selectable relative rotation whereby said communication member selectably engages the outer surfaces of individual ones of said plurality of filter elements.

2. A filter system according to claim 1 and wherein said upstream surface is the outer surface.

3. A filter system according to claim 1 and wherein said communication member is centrally located with respect to said plurality of filter elements.

4. A filter system according to claim 1 and wherein said communication member is formed with a communication inlet slot which is brought into communication with the outer surfaces of individual ones of said plurality of filter elements by rotation of said communication member.

5. A multiple element filter system comprising:
   a filter housing defining a water inlet for water to be filtered;
   a filtered water outlet;
   a plurality of cylindrical filter elements, each defining upstream and downstream surfaces, disposed in said filter housing such that during filtering operation said upstream surfaces communicate with said water inlet and said downstream surfaces communicate with said filtered water outlet;
   a flushing assembly including a movable flushing communication member arranged for selectable flushing communication with said upstream surfaces of each of said plurality of filter elements; and
   means for selectable coupling of said communication member to a flush drain,
   and wherein each individual one of said plurality of filter elements is rotatably mounted.

6. A filter system according to claim 5 and wherein said upstream surface is the outer surface.

7. A filter system according to claim 5 and wherein said communication member is centrally located with respect to said plurality of filter elements.

8. A multiple element filter system comprising:
   a filter housing defining a water inlet for water to be filtered;
   a filtered water outlet;
   a plurality of cylindrical filter elements, each defining upstream and downstream surfaces, disposed in said filter housing such that during filtering operation said upstream surfaces communicate with said water inlet and said downstream surfaces communicate with said filtered water outlet;
   a flushing assembly including a movable flushing communication member arranged for selectable flushing communication with said upstream surfaces of each of said plurality of filter elements; and
   means for selectable coupling of said communication member to a flush drain,
   and wherein said flushing assembly comprises means exterior of said filter housing for selectably rotating said communication member into communication with the outer surfaces of at least one of said plurality of filter elements and for providing rotation of said at least one of said plurality of filter elements while said at least one of said plurality of filter elements is in communication with said communication member.

9. A filter system according to claim 8 and wherein said upstream surface is the outer surface.

10. A filter system according to claim 8 and wherein said communication member is centrally located with respect to said plurality of filter elements.

11. A multiple element filter system comprising:
    a filter housing defining a water inlet for water to be filtered;
    a filtered water outlet;
    a plurality of cylindrical filter elements, each defining upstream and downstream surfaces, disposed in said filter housing such that during filtering operation said upstream surfaces communicate with said water inlet and said downstream surfaces communicate with said filtered water outlet;
    a flushing assembly including a movable flushing communication member arranged for selectable flushing communication with said upstream surfaces of each of said plurality of filter elements; and
    means for selectable coupling of said communication member to a flush drain,
    wherein said communication member is formed with a communication inlet slot which is brought into communication with the outer surfaces of individual ones of said plurality of filter elements by rotation of said communication member,
    and wherein said flushing assembly comprises:
    communication member extension means coupled to said communication member; and
    element extension means coupled to individual ones of said plurality of filter elements, for providing rotation of each individual one of said plurality of filter elements about its own longitudinal axis from a location external of said filter housing.

12. A filter system according to claim 11 and wherein said flushing assembly also comprises:
    a crank handle for providing manually driven rotation of said element extension means; and
    crank handle support means onto which said crank handle is mounted, said crank handle support means being coupled to said communication member extension means and being rotatable therewith such that when said crank handle is located for engagement with a given one of said plurality of filter elements for rotation thereof, said communication inlet slot of said communication member is in operative communication with the outer surface of said given one of said plurality of filter elements, whereby rotation of said given one of said plurality of filter elements causes substantially the entirety of the outer surface of said given one of said plurality of filter elements to be scanned by said communication inlet slot, the pressure relationship being such that when said communication member is coupled to the flush drain, a positive pressure gradient exists across the portion of said given one of said plurality of filter elements being in flushing communication with said communication inlet slot, causing dirt from said given one of said plurality of filter elements to be flushed into said communication inlet slot and out said flush drain.

13. A filter system according to claim 11 and wherein said upstream surface is the outer surface.

14. A filter system according to claim 11 and wherein said communication member is centrally located with respect to said plurality of filter elements.

15. A multiple element filter system comprising:
a filter housing defining a water inlet for water to be filtered;
a filtered water outlet;
a plurality of cylindrical filter elements, each defining upstream and downstream surfaces, disposed in said filter housing such that during filtering operation said upstream surfaces communicate with said water inlet and said downstream surfaces communicate with said filtered water outlet;
a flushing assembly including a movable flushing communication member arranged for selectable flushing communication with said upstream surfaces of each of said plurality of filter elements; and
means for selectable coupling of said communication member to a flush drain,
and wherein said flushing assembly includes means for providing relative rotation between said communication member and said plurality of filter elements about a first axis and rotation of each individual one of said plurality of filter elements about its own longitudinal axis which lies parallel to said first axis.

16. A filter system according to claim 15 and wherein said upstream surface is the outer surface.

17. A filter system according to claim 15 and wherein said communication member is centrally located with respect to said plurality of filter elements.

18. A multiple element filter system comprising:
a filter housing defining a water inlet for water to be filtered;
a filtered water outlet;
a plurality of cylindrical filter elements, each defining upstream and downstream surfaces, disposed in said filter housing such that during filtering operation said upstream surfaces communicate with said water inlet and said downstream surfaces communicate with said filtered water outlet;
a flushing assembly including a movable flushing communication member arranged for selectable flushing communication with said upstream surfaces of each of said plurality of filter elements; and
means for selectable coupling of said communication member to a flush drain,
and wherein said means for selectable coupling of said communication member to said flush drain comprises means for blocking said water outlet during flushing.

19. A filter system according to claim 18 and wherein said upstream surface is the outer surface.

20. A filter system according to claim 18 and wherein said communication member is centrally located with respect to said plurality of filter elements.

* * * * *